United States Patent [19]

Stoffel

[11] Patent Number: 4,862,197

[45] Date of Patent: Aug. 29, 1989

[54] PROCESS FOR MANUFACTURING THERMAL INK JET PRINTHEAD AND INTEGRATED CIRCUIT (IC) STRUCTURES PRODUCED THEREBY

[75] Inventor: John L. Stoffel, San Diego, Calif.

[73] Assignee: Hewlett-Packard Co., Palo Alto, Calif.

[21] Appl. No.: 902,287

[22] Filed: Aug. 28, 1986

[51] Int. Cl.[4] .............................................. G01D 15/16

[52] U.S. Cl. .................................. 346/140 R; 29/620; 219/216; 338/309; 338/314; 346/76 PH

[58] Field of Search ......................... 219/543, 216 PH; 338/307, 308, 306, 309, 310, 311, 312, 313, 314; 400/120; 346/139 C, 76 PH, 140 R; 29/620

[56] References Cited

U.S. PATENT DOCUMENTS 4,617,575 10/1986 Fuyama et al. ................. 338/309 X

FOREIGN PATENT DOCUMENTS 0259467 12/1985 Japan .............................. 346/76 PH

*Primary Examiner*—A. D. Pellinen
*Assistant Examiner*—Morris Ginsburg
*Attorney, Agent, or Firm*—William J. Bethurum

[57] ABSTRACT

A new and improved thermal ink jet printhead and fabrication process therefor are described. In one embodiment of this invention, heater resistors are formed on one area of an insulating substrate and relative large area electrical contacts are formed on an adjacent area of the insulating substrate. A barrier layer is formed over the conductive trace pattern defining the heater resistors on the one area, and a small via in this layer provides an electrical path between the large area electrical contacts and the conductive trace pattern, and thus provides a current drive path for the heater resistors. The small via provides minimum exposure of the barrier sidewall area and area of the conductive trace pattern and thus improves device reliability and fabrication yields and also improves electrical contact to the printhead.

Alternatively, the barrier layer may be made less than laterally coextensive with the conductive trace material to thereby leave a small area of the trace material available for metal overlay connection to the large area contact pad which is formed to the side of the conductive trace material.

5 Claims, 3 Drawing Sheets

PROCESS FOR MANUFACTURING THERMAL INK JET PRINTHEAD AND INTEGRATED CIRCUIT (IC) STRUCTURES PRODUCED THEREBY

TECHNICAL FIELD

This invention relates generally to thermal ink jet printhead construction and more particularly to an improved integrated interconnect circuit extending between the printhead heater resistors and external pulse drive circuitry for supplying drive current to these heater resistors.

BACKGROUND ART

In the manufacture of thin film resistor (TFR) type of thermal ink jet printheads, it is a common practice to photolithographically define the individual heater resistors on a TFR substrate by creating a pattern in an overlying conducting trace layer. This layer is deposited in a predetermined pattern on the resistive heater material using known deposition techniques. The resistive heater layer material may, for example, be tantalum-aluminum, TaAl. The conductive trace pattern is most typically aluminium, although it could also be gold or other conductive material compatible with the other materials in the materials set for the printhead. After the conductive trace material or pattern is completed, it is then usually covered with an inert barrier layer such as a composite layer of silicon nitride and silicon carbide in order to protect the underlying layers from cavitation wear and ink corrosion.

In order to make electrical contact between this conductive trace material and external pulse drive circuitry for the printhead, one standard prior art approach involved etching a relatively large opening or via in the silicon nitride/silicon carbide composite barrier layer and then forming a relatively large contact pad in this opening to thus make contact with the underlying aluminum trace conductor material. Then, wire bonding or pressure contact connections could be made to this relatively large contact pad to provide an electrical current path into the aluminum trace material and to the ink jet heater resistors.

The above prior art structure is possessed with several disadvantages associated with the relatively large opening or via in the insulating barrier layer and directly over the aluminum conductive trace layer. The first of these disadvantages resides in the fact that the large via in the silicon nitride/silicon carbide composite layer exposes a relatively large sidewall area of these materials. This large area sidewall exposure means increasing the area in which pinholes or cracks might possibly occur and thus produce electrical shorts in the barrier layer. As a result of the dissimilarity of the silicon nitride and silicon carbide layers and the differences in their etch rates, there is produced a "diving board" geometry at the edge of these two dissimiliar insulating materials at the via opening. This stepped geometry, when coupled with the large area deposited contact pad in the via, increases the probability of material defects in this region which are capable of reducing wafer processing yields.

Another disadvantage of the above prior art electrical interconnect approach involves exposing a relatively large area of the aluminum trace material in order to provide the desired wide area contact pad thereover. The exposure of such a large area of aluminum trace material in the manufacturing process increases the possibility of forming aluminum oxide, $Al_2O_3$, on the conductive trace material and thus rendering it insulating or partially insulating instead of fully conducting.

Another disadvantage of using the above prior art approach resides in the increased probability of undercutting the silicon nitride and silicon carbide layers during the etching of the via therein. Again, such increased probability is caused by the exposure of the relatively wide area sidewall of the silicon nitride/silicon carbide barrier defining the via.

Another disadvantage of using the prior art approach described above relates to the formation of a nonflat dish-shaped contact pad directly over the aluminum trace material. This geometry and structure increases the likelihood of scratching the edge of the printhead structure immediately adjacent the conducting trace material, and such scratching in turn increases the likelihood of producing electrical shorts down through the printhead structure to the aluminum conductive trace material. In addition, the dish shape or non-planar contour of the contact pad makes it difficult to make certain types of electrical connections to the printhead structure, e.g. spring biased pressure connections from a lead frame-type of flexible circuit.

A further disadvantage of using the above prior approach relates to the sensitivity of chipping and cracking at the edges of the multiple layers of materials over which the dish-shaped contact is placed. This chipping and cracking will cause corrosion of these materials at their outer edges, but this does not occur in devices manufactured by the present invention where the lead-in contacts have been removed from pressure contact at the.edges of these interior layered materials.

DISCLOSURE OF INVENTION

The general purpose of this invention is to provide a new and improved integrated circuit interconnect structure for providing drive current to thermal ink jet printhead heater resistors and a high yield process for fabricating same. This interconnect structure is uniquely adapted and constructed for making good electrical connections to spring biased pressure contacts, such as individual fingers or leads on a lead frame type of flexible or "flex" circuit.

To accomplish this purpose, I have discovered and developed a printhead structure and fabrication process therefor which includes forming a resistive layer on an insulating substrate and then forming a conductive trace pattern laterally coextensive with the resistive layer and extending only over a predetermined area of the insulating substrate. The conductive trace pattern has an opening therein defining a resistor heater element. Next, an insulating barrier layer is formed atop the conductive trace material and extends down over the edges of the conductive trace material and the resisitive layer and then out over a predetermined area of the adjacent insulating substrate. Then, a small via is formed in the insulating barrier layer and over the conductive trace pattern, so that a subsequently deposited metal overlay pattern may be extended from into the via and then out over the adjacent area of the insulating substrate where no conductive trace material extends. In this manner, the interconnect metal in this latter area provides a relatively large and flat electrical contact area for spring biased contacts. And, the electrical connection to the conductive trace pattern is only through the relatively small via in the barrier layer where the area of edge exposure in the barrier layer and the area of conductive trace material exposure is maintained at a minimum.

The above and other advantages, novel features and alternative methods of construction of this invention will become better understood in the following description of the accompanying drawings.

BEST MODE FOR CARRYING OUT THE INVENTION

Figure 1:
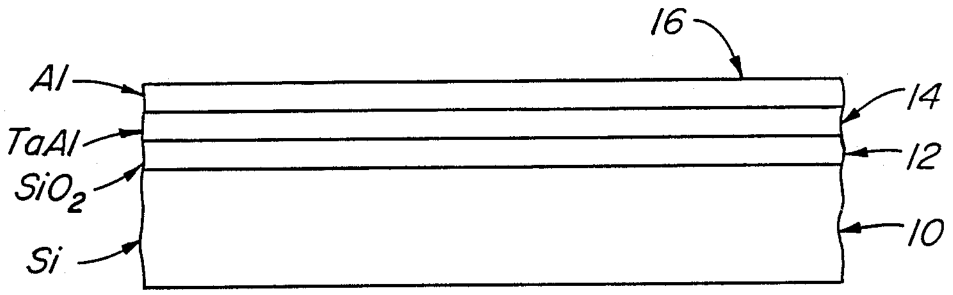
FIGS. 1 through 7 illustrate, in schematic views; a series of thin film resistor process steps utilized in fabricating a printhead interconnect structure according to the invention.

Referring now to FIG. 1, a substrate starting material 10 such as silicon is treated using either thermal oxidation or vapor deposition techniques to form a thin layer 12 of silicon dioxide thereon. The combination of the silicon substrate 10 and the layer 12 of silicon dioxide will be referred to herein as the "insulating substrate" upon which a subsequent layer 14 of resisitive heater material is deposited. Preferably, the layer 14 will be tantalum aluminum, TaAl, which is a well known resistive heater material in the art of thermal ink jet printhead construction. Next, a thin layer 16 of aluminum is deposited atop the tantalum aluminum layer 14 to complete the structure of FIG. 1.

In the particular materials set described above for a preferred embodiment of the invention, the silicon-silicon dioxide combination 10, 12 was approximately 600 microns in thickness; the tantalum aluminum layer 14 was approximately 1000 angstroms in thickness; and the aluminum conductive trace material 16 was approximately 5000 angstroms in thickness. The resistor and conductor materials were magnetron sputter deposited. This materials set is generally well known in the art and is described, for example, in the *Hewlett-Packard Journal*, Vol. 36, No. 5, May, 1985, incorporated herein by reference.

Figure 2:
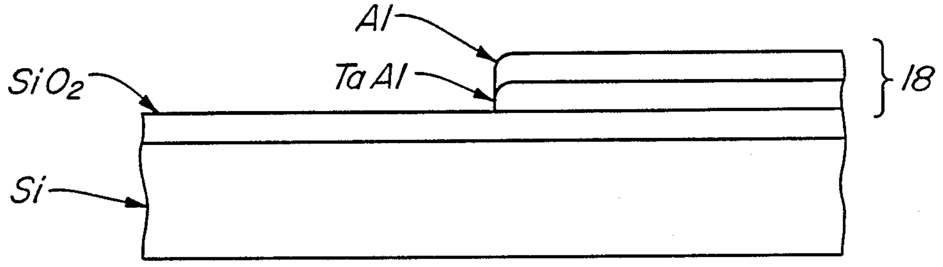
Figure 3:
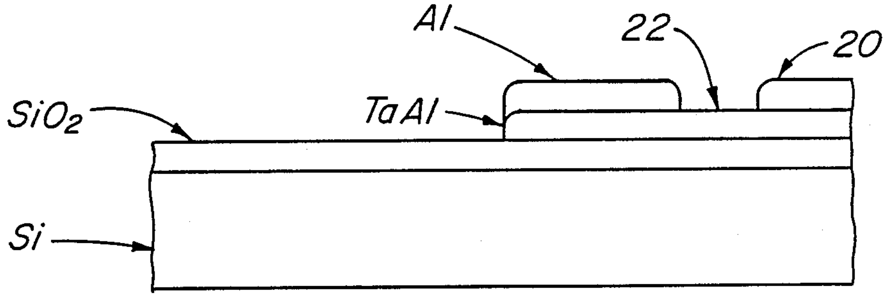

Referring now to FIG. 2, the structure shown therein was appropriately masked and etched with a suitable etchant in order to define the composite island 18 of tantalum aluminum 14 and aluminum 16 on the right hand side of the insulating substrate. As will become better appreciated below, the island 18 is formed on only a portion of the insulating substrate 10 and 12, leaving an area of the left hand side of the substrate available for making good electrical contacts of the type to be described. Next, as shown in FIG. 3, a pattern is etched in the aluminum layer 16 to form the opening 20 which defines the lateral extent of a resistive heater element 22 which is current driven by the conductive trace aluminum layer 16.

Figure 4:
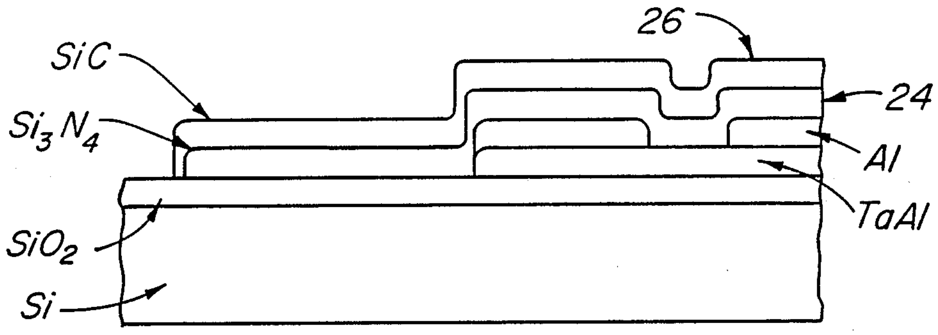

Next, as shown in FIG. 4, a composite layer barrier material is deposited over the upper surface of the structure in this figure and includes a first layer 24 of silicon nitride which is covered by a second layer of highly inert silicon carbide. This composite layer (24, 26) barrier material provides both good adherance to the underlying materials and good insulation and protection against cavation wear and ink corrosion which the underlying layers beneath these materials 24 and 26 would otherwise receive during an ink jet printing operation.

Figure 5:
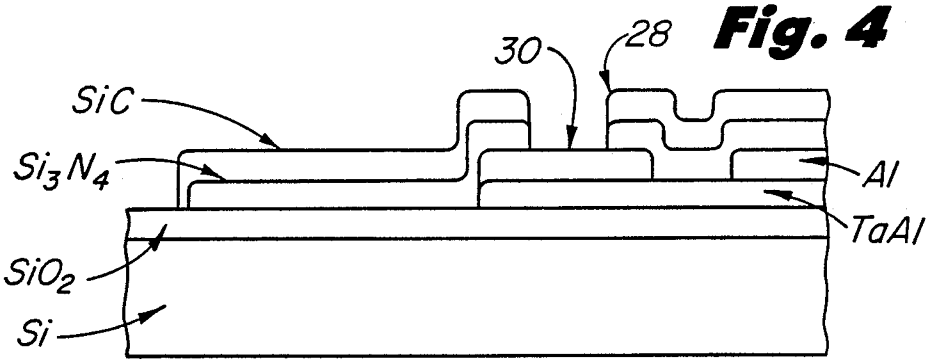
Figure 6:
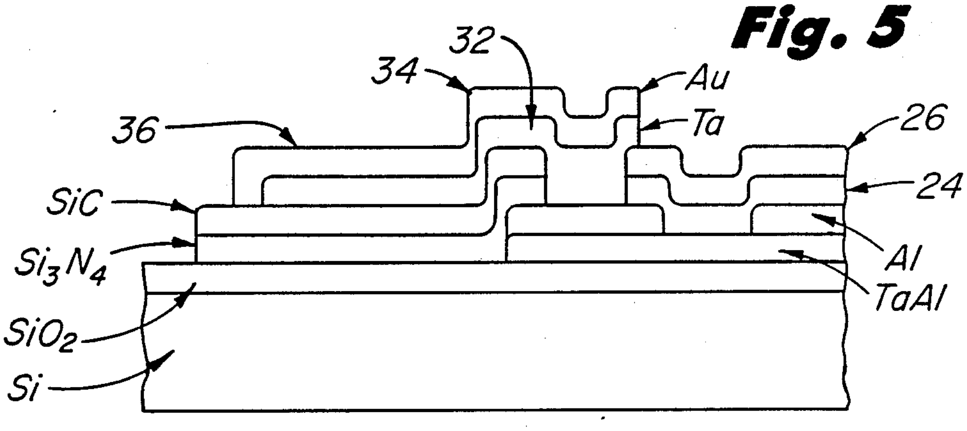

Next, as shown FIG. 5, a relatively small via 28 is dry etched in the composite silicon nitride/silicon carbide barrier layer using Freon gas to thereby leave a small area 30 in the aluminum conductive trace material exposed for further electrical contact. Such contact is made as shown in FIG. 6 when a conductive lead-in or overlay pattern of conductors 32 and 34 are magnetron sputter deposited on the surface of FIG. 5 and extend from into electrical contact with a relatively small area 30 of conductor trace material and then out onto the left hand side of the structure in FIG. 5 and atop the previously deposited barrier layer material. The combined thickness of the gold and tantalum layer is approximately 2 microns.

This conductive lead-in composite structure includes a first layer 32 of tantalum and a second layer 34 of gold successively deposited in the geometrical configuration shown using conventional masking and metal evaporation techniques. Thus, the area 36 on the upper surface of the gold layer 34 in FIG. 6 extends over a relatively wide and flat area of the integrated structure and is located away from the aluminium conductive trace pattern previously described. This construction therefore enables a finger or spring lead contact member 38, which may be part of a larger lead frame member (not shown), to be brought into good firm pressure contact with the surface area 36 of the gold layer 34 and without causing any detrimental effect on the aluminum conductive trace pattern. This larger lead frame member is described in more detail in copending application of Janet E. Mebane et al Ser. No. 037,289 filed Apr. 9, 1987 and assigned to the present assignee.

Figure 7:
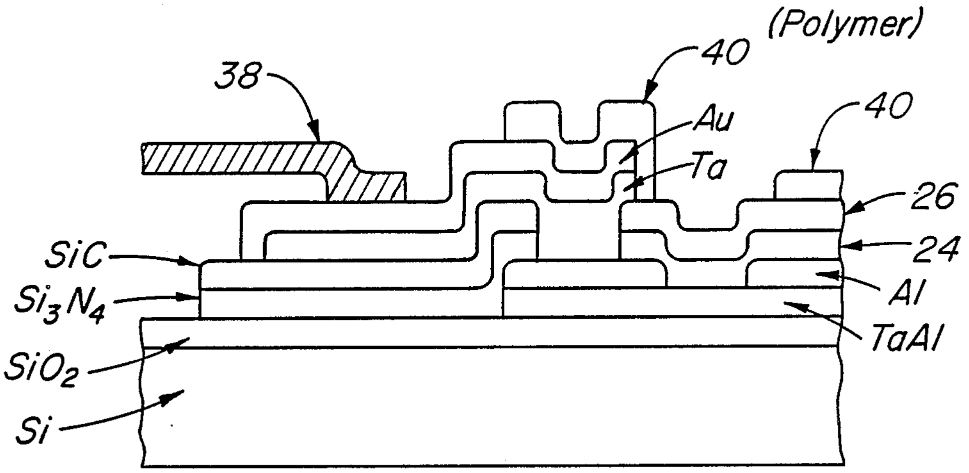

Finally, and of course prior to the application of the spring biased contact 38, a surface pattern of polymer material 40 is formed in the geometry shown in FIG. 7 to a thickness of approximately 50 microns. This polymer material provides a protective layer or shield over the contact via 30 and over the electrical contact layers 32 and 34 extending down into contact therewith.

It will be understood that, for sake of brevity, only a single heater resistor and conductive trace connection therefor has been shown. However, in actual practice the printhead will have many of these heater resistors which will usually be symmetrically spaced in a rectangular pattern on one area of the insulating substrate.

Figure 8:
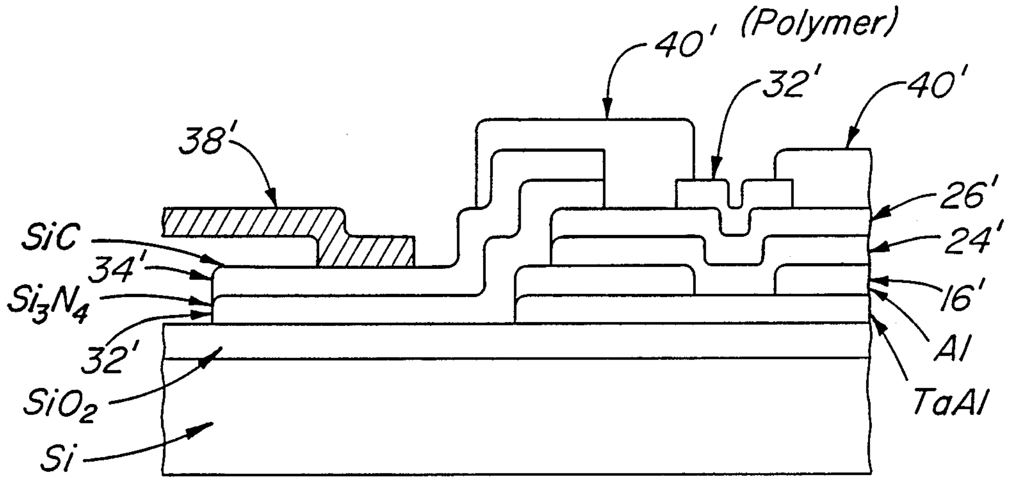
FIG. 8 is an alternative embodiment of the invention wherein the barrier layers have been laterally reduced to expose an edge portion of the underlying aluminum trace material for subsequent metal overlay thereon.

Various modifications may be made in the above described embodiment without departing from the scope of this invention. For example, in FIG. 4, it may be preferable in certain applications to deposit layers 24 and 26 on only a predetermined area of the underlying aluminum trace material 16. Then, the tantalum and gold layers 32 and 34 would be deposited over an area of edge exposed aluminum trace material and down and out over the now-exposed silicon dioxide layer 12 on the left hand side of the device structure. Thus, in this modified embodiment as shown in FIG. 8, the tantalum-gold composite layer 32', 34' on the now-exposed left hand SiO2 layer 12 will serve as the electrical contact area for receiving the above spring biased leads or the like. The $Si_3N_4$/Si C composite layer 24', 26' is masked and etched so as to leave a small edge portion of the aluminium trace material 16' exposed to receive the tantalum layer 32' thereon as shown in FIG. 8. And, as in FIG. 7, there is a relatively wide area on the surface of the gold film 34' for recieving the spring biased lead contact 38'. Finally, and also as in FIG. 7, the outer layer 40' in FIG. 8 corresponds to the surface protection polymer layer 40 as indicated above with respect to FIG. 7.

INDUSTRIAL APPLICABILITY

The present invention is used in the fabrication of printheads for thermal ink jet printers which serve as standard peripheral equipment for a variety of computers and the like.

I claim:

1. A process for fabricating a thin film resistor printhead structure which includes:

a. forming a resistive layer on an insulating substrate and a conductive trace pattern located on the resistive layer and having an opening therein defining a resistive heater element, b. forming an insulating barrier layer atop said conductive trace pattern, c. forming a via in said insulating barrier layer for receiving a metal overlay pattern in electrical contact with said conductive trace pattern said via having a geometry which exposes a predetermined area of said conductive trace pattern, and d. extending said metal overlay pattern from said conductive trace pattern and through said via and down over an adjacent area of said insulating substrate, whereby the metal overlay pattern over said adjacent area of said insulating substrate provides a relatively large and flat electrical contact area remote from said conductive trace pattern for receiving a spring biased contact.

2. A thin film resistor printhead and interconnect structure including, in combination:

a. a resistive layer and a conductive trace pattern formed on a predetermined area of an insulating substrate, and said conductive trace pattern having an opening therein defining a resistive heater element, b. an insulating barrier layer formed atop said conductive trace pattern and having a surface geometry which exposes a predetermined area of said conductive trace pattern, and c. a metal overlay pattern extending from said conductive trace pattern and down over and on an adjacent area of said insulating substrate under which no conductive trace pattern appears, whereby the metal over said adjacent area of said insulating substrate provides a relatively large and flat electrical contact area for receiving a spring biased contact.

3. The structure defined in claim 2 wherein a small via is made in said insulating barrier layer to expose said conductive trace pattern for connection to said metal overlay pattern.

4. The structure defined in claim 2 wherein said insulating barrier layer is formed of smaller lateral dimension than said conductive trace pattern to thereby leave an edge area of said conductive trace pattern exposed to receive said metal overlay pattern in electrical contact therewith.

5. A thin film interconnect structure including, in combination:

a. a resistive layer and a conductive trace pattern formed thereon disposed on a predetermined area of an insulating substrate, and said conductive trace pattern having an opening therein defining a resistive transducer element, b. an insulating barrier layer formed atop said conductive trace pattern and having a surface geometry which exposes a predetermined area of said conductive trace pattern, and c. a metal overlay pattern extending from said predetermined area of said conductive trace pattern and down over and on an adjacent area of said insulating substrate under which no conductive trace pattern appears, whereby the metal on said adjacent area of said insulating substrate provides a relatively large and flat electrical contact area for receiving an electrical contact.

* * * * *